J. V. MARTIN.
AEROPLANE ALIGHTING DEVICE.
APPLICATION FILED MAR. 5, 1921.

1,431,017.

Patented Oct. 3, 1922.
5 SHEETS—SHEET 3.

Inventor
J. V. Martin

By F. W. L. Bryant.
Attorney

Patented Oct. 3, 1922.

1,431,017

UNITED STATES PATENT OFFICE.

JAMES V. MARTIN, OF GARDEN CITY, NEW YORK.

AEROPLANE ALIGHTING DEVICE.

Application filed March 5, 1921. Serial No. 450,034.

*To all whom it may concern:*

Be it known that I, JAMES V. MARTIN, a citizen of the United States of America, residing at Garden City, in the county of Nassau and State of New York, have invented certain new and useful Improvements in Aeroplane Alighting Devices, of which the following is a specification.

It is not a novel conception to house various motors, tanks, people and cargo within the upper and lower skin of an aeroplane wing, but to produce a design wherein these and other elements of the aeroplane are housed within a form of wing having a high lift-drift value and a practical, internal trussing system is the object of this invention. With this as the principal object, the more detailed objects of this invention are as follows:

To produce a wing combination of high lift-drift values which can be readily reduced in area during flight without weakening the internal truss of the aeroplane.

To create a combination of two or more aerofoils so juxtaposed that the interference of one wing upon the other shall increase the efficiency of one wing without a corresponding decrease of efficiency upon the other, or in other words, so that the sum of the interference shall be more helpful than harmful, i. e., beneficial interference.

To collapse and retract a flotation means snugly under the wing of an aeroplane during flight, being a variation of the invention shown in my application upon retractable pontoons, filed April 24, 1920, Serial No. 376,351.

To house within the wing an aeroplane flotation means.

To house within the wing, a chassis or ground alighting gear and provide novel means for extending said chassis, being a development of the invention shown in my application filed Nov. 14, 1918, Serial No. 262,477.

To retract the propeller within the wing during flight in order to repair, replace or reduce the resistance of said propeller.

To provide within the wing of an aeroplane a support for mail, parcel, or bomb so designed that any of the said articles may be released and allowed to drop out of both their support and the wing to which the support is secured.

To provide an efficient aeroplane wing of such strength and proportions that it will accommodate within its upper and lower skins, smaller aeroplanes and gliders and to adapt said wing as a suitable starting and alighting place for said aeroplanes.

To provide a life preserver glider and store same within the wing with rapid detachable gear so that in case of fire or other danger, the passengers may exit from the wing and glide to a field or to the water where the said glider will float until assistance arrives.

To provide a form of internal truss designed to perform the double function of a truss and a partition dividing sleeping and dining rooms from engine rooms and the like.

To provide a circulation system for large aeroplane wings designed to circulate the air naturally and freely to the various sleeping, eating, storing and other compartments of the aeroplane.

To provide within the wing, a power transmission unit especially adapted for installation in a wing and having a high degree of reliability and efficiency.

To provide a weight distribution of cargo, power units and passengers which will reduce the stresses of flying and alighting as broadly set forth in my prior application Serial No. 294,466 filed May 3rd, 1919.

To provide special means for varying propeller velocity at high altitudes.

To provide a pressure valve and pump system for the automatic regulation of the internal wing pressure at varying altitudes.

To provide an improved form of aileron adaptable to a retractable wing.

A further object of the invention is to provide multiple means for retracting and extending the chassis or pontoons so that one being for any cause inoperative, the others will be available, and in connection with such a compact device or compact arrangement of such devices, it is a further object of the invention to provide means for storing energy obtained simultaneously with the chassis retraction in order to use such stored energy at will for the extension of the said chassis or pontoon alighting gear.

A further object of the invention is to provide in connection with the wing end of an aeroplane, a type of side light wholly enclosed within the wing but transparent through said wing and screened from certain arcs by the said wing.

A further object of the invention is to provide an improved carriage for a servo-motor adapted to retract or extend said servo-motor at will.

Heretofore, wires, struts, chassis, pontoons and braces have been fitted externally to what has been called an aeroplane body, nacelle or fuselage, these members are useless aerodynamically since there is no lifting component to the resistance they create, therefore refinement has required their elimination during flight and various methods for drawing chassis and other members within the aeroplane body during flight, have been proposed and actually accomplished.

However, the body resistance is also of the useless character called parasite resistance and therefore in the more refined aeroplanes of the future, the designer must face the double problem of retaining continuity and proportion of a wing truss positioned between the upper and lower skins of the wing and at the same time so shaping and disposing the chassis and other retractable parts that these can be drawn within the the wing without interfering with the truss which is essential to the strength of the wing structure. Therefore, the combination of parts such as retractable chassis, with a wing structure, are distinctively inventive disclosures of the greatest usefulness to the advancing art.

The drawings indicate the internally trussed type of wing possessing wing bars and ribs as indicated, so spaced and formed that the intervening spaces become available and adapted to accommodate the chassis when retracted and housing for the power units. Also, double use has been made of the rib and spar truss to support the partitions 87 and 88 which separate various rooms and compartments in the aeroplane from others.

These and other objects of the invention will become apparent from the following detail disclosure in connection with the accompanying drawings, but throughout the invention, there is one consistent purpose, i. e., to so modify and adapt the essential elements of a wing and those of the elements which are housed within the wing that a practical and efficient aeroplane will result, and as the relative motions of the parts housed within the wing are accomplished during flight, thus altering the stresses of the wing structure and changing the aeroplane balance, it is essential that the internal wing structure be embodied in practical proportions and designed to care for these and other problems which may be presented.

The construction of aeroplane hereinafter described in detail provides for a main plane or aerofoil of hollow formation with the upper and lower surfaces suitably braced by ribs and wings bars, retractable wings being associated with the lateral extremities of the main aerofoil and the said retractable wings similarly formed of hollow construction and having sectional ailerons hinged thereto under control of the operator within the aerofoil for retracting the wings and the ailerons hinged thereon with the hinge sections of the ailerons being independently operable to vary the lateral control of the aeroplane during flight. Signal lamps are arranged at the extremities of the main wing sections and are so positioned as to direct the rays forwardly and laterally of the wings and aerofoil without the light rays crossing the bow of the main aerofoil section. Driving transmissions for a plurality of propellers are arranged transversely of the aerofoil section while storage and living compartments are similarly arranged in the aerofoil to provide for distribution of weight therein. Collapsible and retractable pontoons are associated with the aerofoil while a servo-motor normally housed within the aerofoil is adapted to be lowered to operative position to effect operation of a mechanical device for raising and lowering the pontoons, and inflating the same, and also in retracting and projecting the landing chassis of the aeroplane. The invention further provides for a plurality of motors operatively associated with each propeller with the motors and propeller shiftably mounted within the aerofoil for retracting and projecting the propeller blades relative to the aerofoil for repair or replacement. The invention further contemplates as an improvement in the art, a novel construction of landing and discharging apparatus for a smaller aeroplane to be received, retained or discharged from within the main aerofoil section.

Describing the invention more in detail, and with particular reference to Figs. 1 to 4, there is illustrated an aeroplane embodying a centrally positioned fuselage 1 with the usual empennage thereof including a pair of operable elevating and lowering transverse planes 2 and a vertical rudder 3, these elements being operable from within the fuselage at a convenient point.

A main plane or aerofoil section 4 of hollow construction carries a fuselage 1. The said main plane embodies a compartment 4' having upper and lower skin surfaces 5 and 6 respectively with the skin walls maintained in spaced relation by the bracing ribs and struts 7 shown more clearly in Figs. 14 and 17, the general design of the aerofoil being such as to provide for the least resistance during flight.

Figures 1, 2:
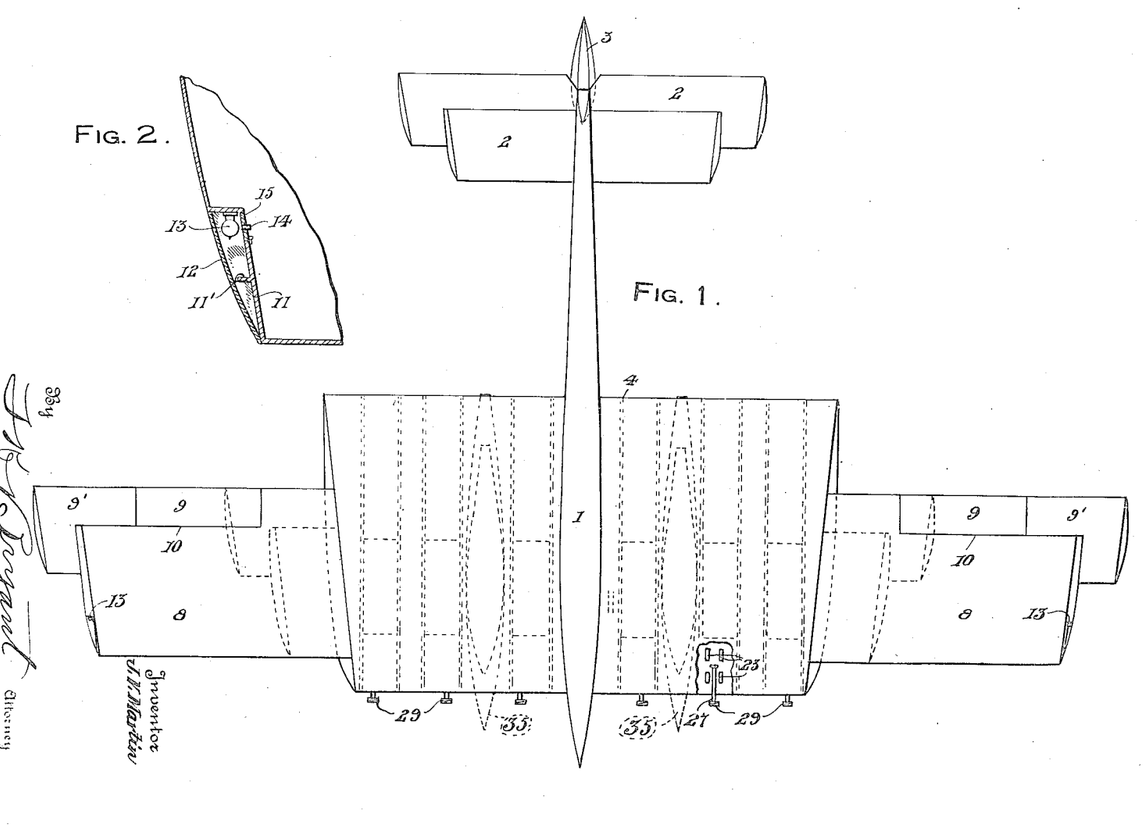
Figure 1 is a top plan view of an aeroplane constructed in accordance with the present invention showing the retractable wing sections and the transversely positioned propellers and driving motors therefor.
Figure 2 is a detail sectional view of one end of a wing section showing the signal lamp and colored covering glass plate therefor.
Figures 11, 12, 13:
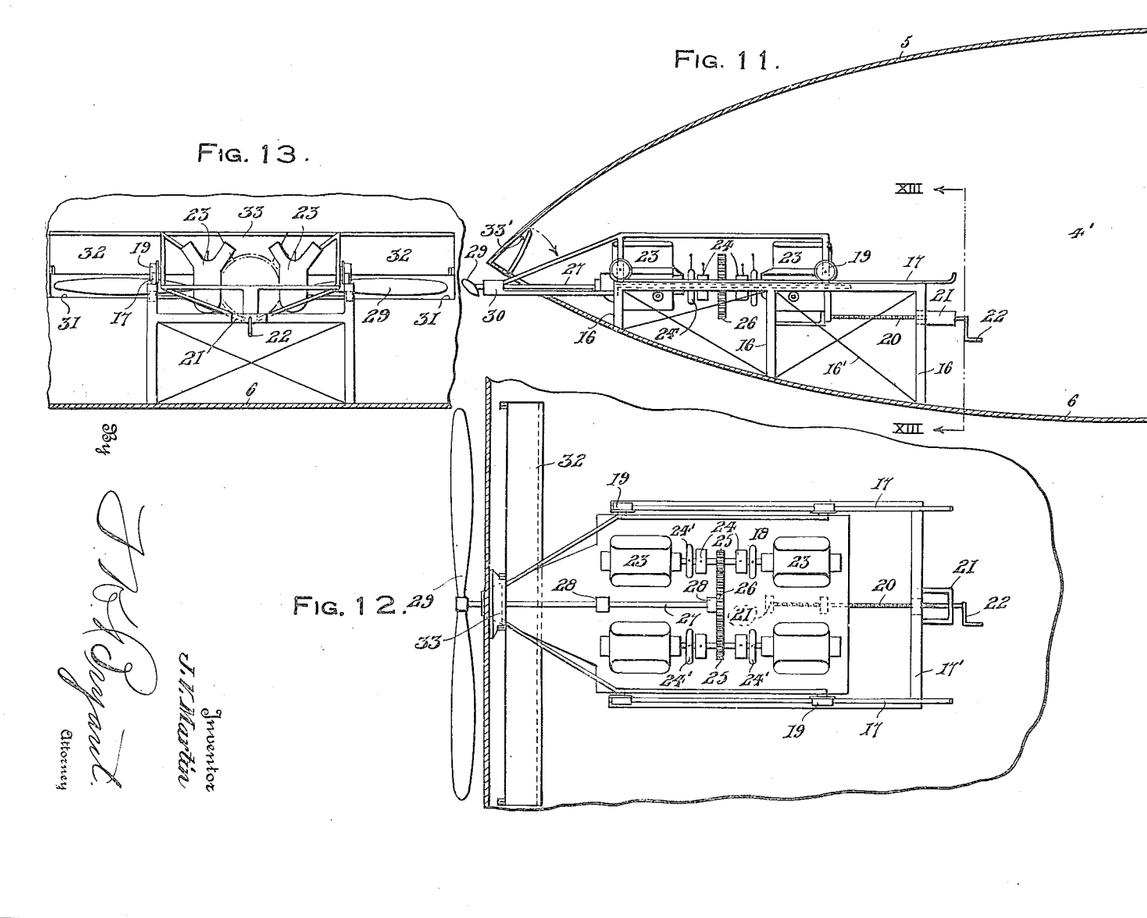
Figure 11 is a detail sectional view of the forward end of the aerofoil showing the track supported carriage with the driving motors and transmission for the propeller shaft mounted on the carriage and adapted for movement on the track to draw the propeller shaft and propeller blade into the aerofoil.
Figure 12 is a detail sectional view of the forward end of the aerofoil showing the track supported carriage in top plan with the driving motors and transmission mounted thereon.
Figure 13 is a detail sectional view taken on line XIII—XIII of Fig. 11 showing in rear elevation, driving motors for the propeller with hinged doors in the forward end of the aerofoil moved to open positions to permit passage therethrough of the propeller shaft and propeller.

As clearly shown in Figs. 1 to 5, retractable wing sections may be associated with the lateral extremities of the aerofoil, the retractable wings being of hollow construction embodying main sections 8 having a pair of rearwardly disposed aileron sections 9 and 9' hinged to the rear edge thereof as at 10 with the sections 9 and 9' capable of independent movement relative to the wing section 8 and each other by the usual devices but operable from within the fuselage or aerofoil, the wings and ailerons being shown in Fig. 1 in dotted line position, as retracted with the outer aileron section 9' projecting laterally of the aerofoil for operation when the wing is retracted to the limit of its inward movement, the retraction of the wings reducing the air resistance of the aeroplane and also permitting the lateral control of the same. As shown in Figs. 1 and 2 the forward edge extermities of the wing sections 8 are provided with pockets 11 closed by colored glass plates 12 constituting a cage for navigation lights with a lamp 13 positioned within the cage, having a deflector 11 associated therewith to prevent the rays of the lamp from crossing the bow of the aeroplane, the construction of wing pocket further preventing the lamp rays from projecting more than two points abaft the beam of the aeroplane, the wing section 8 being of hollow construction. A pilot within the fuselage or aerofoil may easily observe the lamps 13 through the short sight tube 14 carried in the wall of the pocket 11 to ascertain whether or not the lamp is illuminated, while access to the lamp from within the wing, is attained by the provision of the hinged door section 15 in the pocket 11 as clearly shown in Fig. 2. The propulsion of the aeroplane embodies the provision of a plurality of transversely positioned motors within the aerofoil associated with a novel transmission, three operating transmissions and propellers being shown as located at each side of the fuselage, but it is intended that this invention should not be limited, as any number of motors or transmissions may be employed, these transmissions being generally shown in Figs. 1 and 3 to 5, and illustrated in detail in Figs. 11 to 13. A rectangular supporting frame work 16 suitably braced as at 16′ and firmly secured to the structure 6 of the aerofoil carries track rails 17 on the upper portion thereof upon which a carriage 18 provided with track rollers 19 is mounted. To shift the carriage, an operating screw 20 has an end bearing in the arm 21 depending from the carriage plate 18 and is threaded through the cross bar 17′ of the supporting frame with an operating handle 22 upon the free end of the screw rod. Any number of motors may be mounted on the carriage plate 18, four being illustrated by the reference numeral 23 each provided with an independently operable clutch 24 and a gear reducing mechanism 24′ with the alined motors 23 at each side of the carriage firmly secured thereto and operatively associated through the gear box and clutch with gear 25 which is in mesh with the driven gear 26 carried by the propeller shaft 27 journaled in the brackets 28 on the carriage while independent self-starting devices are part of each motor. A propeller blade 29 is fixed to the outer end of each shaft 27 and with the forward end of the propeller shaft 27 being journaled in the frame 30 as clearly shown in Figs. 11 and 12. To provide for the retraction and projection of propeller shaft and blade relative to the aerofoil, the leading edge of the aerofoil is provided with a transverse opening 31 closed by a sectional door embodying lateral members 32 and a central smaller member 33, all of the door being elevated to an open position when the propeller and shaft are retracted while the central smaller door section 33 is alone open when the propeller blade is projected as shown in Figs. 11 and 12, a suitable catch 33′ being associated with the door section 33 to maintain the same in open position as illustrated in Fig. 11. As shown in Figs. 1 to 5, the driving transmissions are arranged transversely of the aerofoil and each motor carriage and propeller is independently operable, one or more of the transmissions being capable of retraction within the aerofoil while the remaining transmissions are in operation, while, by the provision of the independent clutch devices for the several motors associated with each propeller, any one of the series of motors for each propeller may be thrown out of operation at any time for purposes of repair, or otherwise, without the necessity of retracting the associated propeller blade into the aerofoil, or without rendering the same inoperative, and the gear attending mechanism 24′ will permit the relative change of speed between the motors and propeller shafts.

Figures 3, 4, 5, 6, 7:
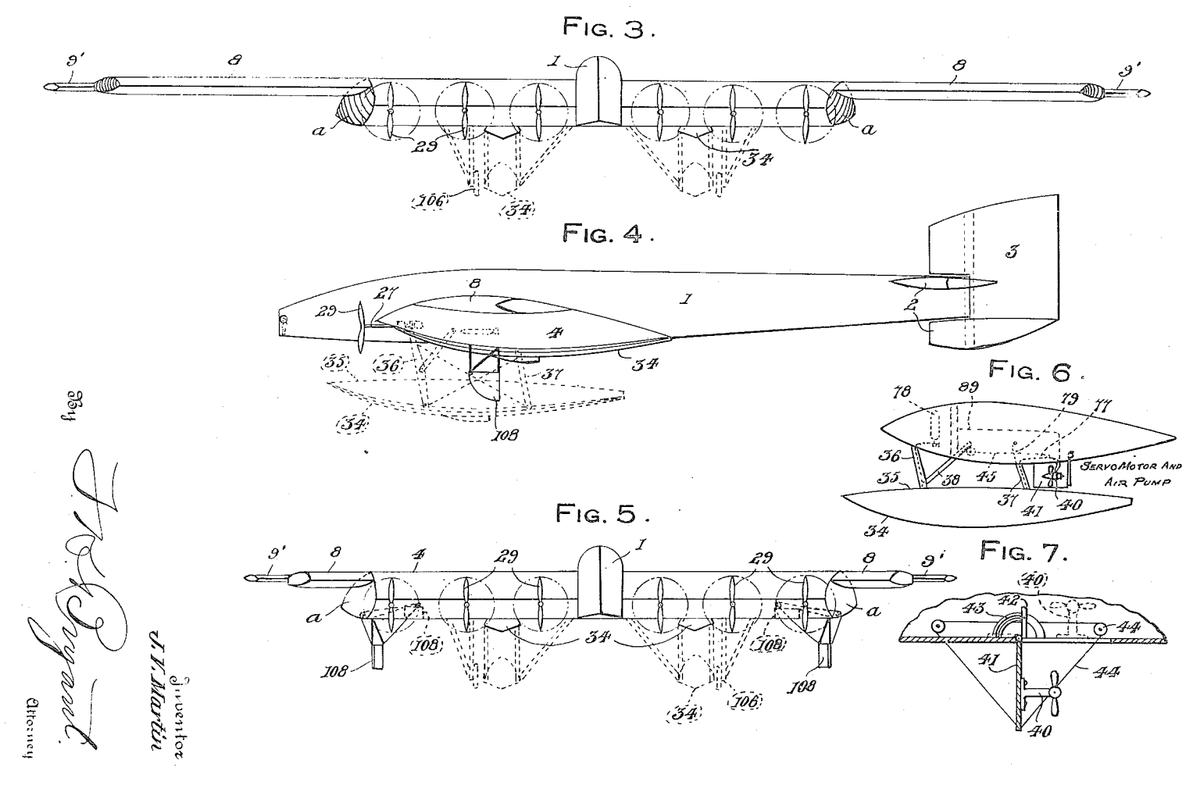
Figure 3 is a front elevational view of the aeroplane showing the pontoons and chassis lowered in their operative positions as indicated by dotted lines.
Figure 4 is a side elevational view showing the central fuselage and the lateral main plane or aerofoil section with the pontoon lowered into operative position and illustrated in dotted lines.
Figure 5 is a front elevational view similar to Fig. 3 showing the outer wing sections retracted into the main aerofoil.
Figure 6 is a fragmentary side elevational view showing the aerofoil and pontoon disposed beneath the same in operative position with the servo-motor and air pump for operating the raising and lowering means for the pontoon.
Figure 7 is a detail sectional view showing the servo-motor supported on a trap door formed in the bottom surface or skin of the aerofoil.
Figures 8, 9:
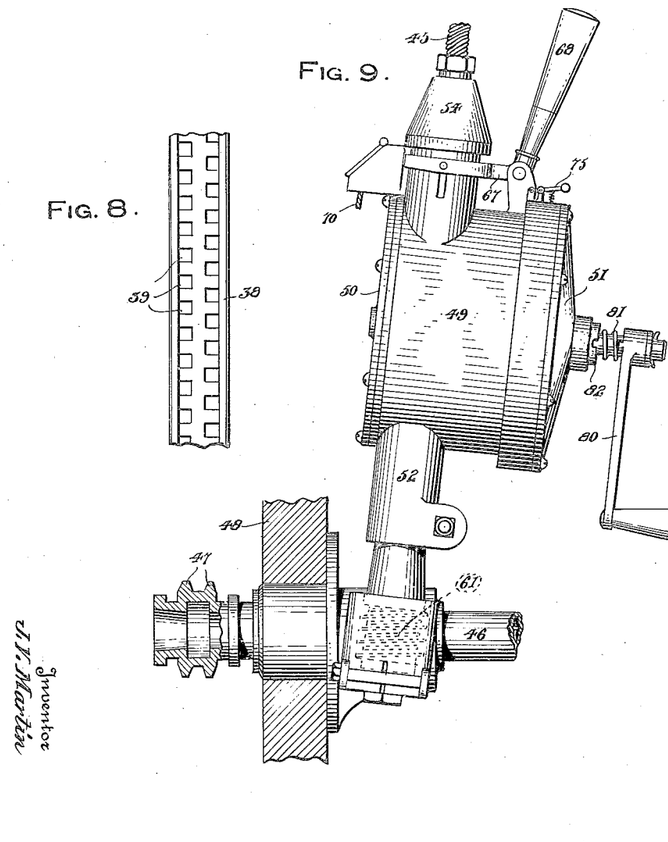
Figure 8 is a fragmentary plan view of the rack bar strut connecting the pontoon to the aerofoil.
Figure 9 is a side elevational view, partly in section of the operating device for raising and lowering the pontoon.

As distinguished from the prior art where a pontoon and landing chassis are ordinarily connected to the fuselage, the present invention provides for a particular construction of aerofoil wherein pontoons and landing chassis are associated directly with the aerofoil, the pontoons being of the collapsible retractable type and with their operating mechanism being more clearly shown in Figs. 3 to 10. The detail construction and operation of the pontoons and retractable chassis are clearly set forth in my copending application Serial No. 262,477 upon retractable chassis and servo-motor, filed November 14, 1918, and herein illustrated as embodying a bottom surface 34 having a flexible top portion 35 adapted to be collapsed therein with the bottom portion designed for intimate contact with the bottom surface of the aerofoil when the same is in its retracted full line position as shown in Fig. 4, the pontoon being supported on the aerofoil by tubular link rods 36 and 37. A rack bar 38 shown in Figs. 4, 6 and 8 is hinged to the link rod 36 at a point adjacent the pontoon 34 and is provided with tooth receiving openings 39 for purposes presently to appear.

The mechanism for raising and lowering the pontoon relative to the aerofoil is shown in detail in Figs. 6 to 10, the same embodying the provision of a servo-motor and air pump 40 mounted upon a hinged trap door 41 provided in the bottom surface of the aerofoil and moved to its lowered operative position as shown in Fig. 7 by the lever 42 fixed thereto and moving over the segment guide 43, guide ropes and pulleys 44 being associated with the trap door 41 and body of the aerofoil. As diagrammatically illustrated in Fig. 6, the servo-motor 40 operates a flexible shaft 45, illustrated in Figs. 9 and 10 which is connected to the mechanical device for raising and lowering the pontoon. This device embodies a shaft 46 carrying a double toothed gear 47 with the shaft 46 supported as at 48 while the gear meshes with the notched rack 38 for reciprocating the same. To effect rotation of the shaft 46 and gear carried thereby, the device shown in Figs. 9 and 10 embodies a cylindrical housing 49 having side closure plates 50 and 51 with a tubular bearing 52 depending from the housing. The flexible shaft 45 is connected to the stem 53 journaled in the cap 54 secured to the upper tubular extension 55 of the housing. A shaft 56 journaled axially of the housing 49 in the side walls 50 and 51 has fixed thereto a bevel gear 57 and a pinion 58 with the pinion 58 meshing with a pinion 59 fixed to the rod 60 that communicates motion to the worm 61 extending into the lower tubular extension 52 of the casing. A sleeve 62 is fixed to the end wall 51 of the housing with the shaft 56 journaled therethrough while the bevel gear 63 carrying a central pinion 64 is journaled on the shaft 56 adjacent the inner end of the sleeve 62 with the pinion 64 meshing with the pinion 59. A driving pinion 65 carried by the inner end of the shaft 53 has a tensioned clutch device 66 associated therewith adapted to be moved to its closed position by the bifurcated arm 67 and hand lever 68 to cause the end of the bifurcated arm to be engaged by the dog 69 controlled by the pull cord 70. When the clutch element 66 is closed and the pinion 65 locked to the driven shaft 63, the bevel gear 57 and pinion 58 will be rotated to drive the pinion 59 and the worm member 61 to effect rotation of the shaft 46 carrying the toothed gear 47 for reciprocating the rack bar 38, this positive drive by the flexible shaft 45 effecting the elevating movement of the pontoon. During the elevation of the pontoon, the pinion 59 meshing with the pinion 64 and with the bevel gear 63 meshing with the driving gear 65 will reversely rotate the bevel gear 63, the gear carrying a lateral flange 71 having one end of a band spring 72 secured thereto as at 73 while the inner end of the spring is secured as at 74 to the stationary sleeve 62, the spring being placed under tension and so maintained by the tensioned pawl 75 engaging the ratchet teeth 76 on the periphery of the flange 71. To effect the lowering movement of the pontoon or chassis, the clutch element 66 is automatically released at the limit of upward movement of the rack bar 38, the rope 70 being connected to the inner end of the rack bar for releasing the dog 69 at the limit of inward movement of the rack bar to disengage the clutch. When it is desired to lower the pontoon, the pawl 75 is disengaged from the ratchet 76 whereupon the spring will rotate the bevel gear 63 and pinion 64 meshing with the pinion 59 to reversely rotate the shaft 60 and communicate a rotary motion to the shaft 46 carrying the gear meshing with the rack bar 38.

It is to be noted that the mechanism here described is operated by a flexible shaft driven from the servo-motor to elevate the pontoon or chassis, the mechanism being manually placed in position for operation by the servo-motor while the limit of upward movement of the pontoon causes the automatic disconnection between the operating mechanism for the pontoon, and the servo-motor, and simultaneously with the upward movement of the pontoon stores energy to effect the lowering movement thereof. When the pontoon 34 is lowered to the position shown in Fig. 6, an air pump associated with the servo-motor has a pipe line connection 77 extending through the tubular brace rod 37 to the interior of the pontoon, while a compressed air tank 76 shown in Fig. 6 and suitably charged, has a flexible pipe connection through the tubular link 36 with the interior of the pontoon, the pontoon being inflated thereby with the flexible cover 35 raised to its limit of upward movement. To exhaust the air from the pontoon when the same is to be elevated, a flexible pipe section 79 extending from within the pontoon to the interior of the aerofoil to the link connection 37, has an automatic valve upon the upper end therefor for exhausting the air from the pontoon to permit the upper wall of the pontoon to collapse within the bottom portion 34 thereof intimately engaging the bottom wall of the aerofoil. Should the servo-motor fail to operate the driven shaft 53, or should the spring 72 become injured, the crank handle 80 freely journaled on the shaft 56 is moved inwardly against the tension of the spring 81 to be clutched with the clutch member 82 having a key connection 83 with the shaft 56, whereby the crank handle, shaft 56 and pinion 58 are connected in unison for operating the pinion 59 and shaft 60 in the desired direction.

Figures 14, 15, 16, 17, 17A:
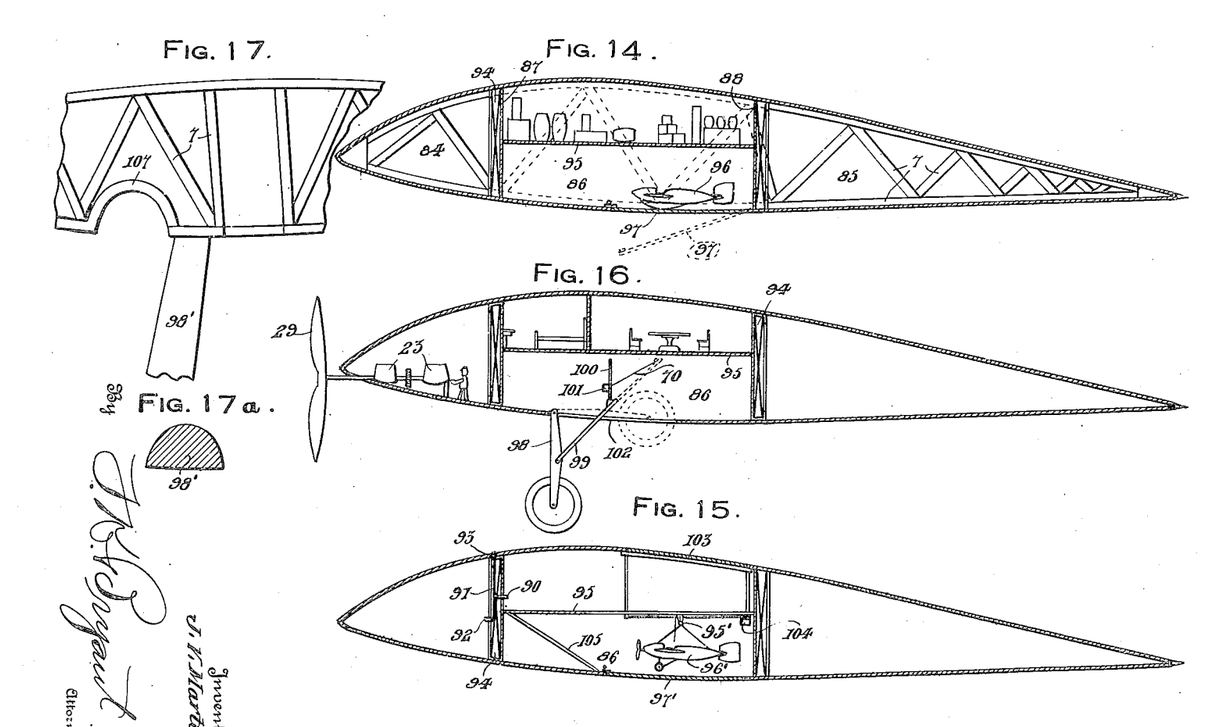
Figure 14 is a longitudinal sectional view taken through the aerofoil showing the brace ribs and trusses, storage compartments and a smaller aeroplane housed therein also a glider located on a door hinged to the bottom surface of the aerofoil.
Figure 15 shows a longitudinal sectional view of a modified form of aerofoil wherein a smaller aeroplane may alight upon the upper surface of the aerofoil for passing to the interior of the aerofoil by an elevator construction with a sliding door in the bottom surface of the aerofoil to permit the smaller aeroplane to drop through the door opening.
Figure 16 shows a form of aerofoil construction, in longitudinal section, wherein a motor operated rod has a gear connection with a rack strut attached to a chassis for retracting and projecting the same relative to the aerofoil.
Figure 17 is a fragmentary detail view showing the type of brace rib construction of the aerofoil with channel grooves in the lower side thereof for accommodating one of the frame struts of the chassis, and Figure 17ª is a cross sectional view of the strut, showing a configuration similar to the channel groove in the rib construction of the aerofoil and the form of the groove in the under aerofoil which is closed flush by the retraction of the chassis frame.

In the forms of the invention shown in in Figs. 14 to 16, the aerofoil construction practically remains the same, but in lieu of the retractable wings and ailerons, rigid wings are associated with the aerofoil, the aerofoil being divided transversely into forward and rearward air tight compartments 84 and 85 and an intermediate compartment 86, the three compartments being separated by the forward and rearward wing bars 87 and 88 respectively. To provide for the proper ventilation of the several air compartments, and to equalize the pressure interiorly and exteriorly of the aerofoil, a flexible tube 89 diagrammatically shown in Fig. 6 extends from the air pump to the forward wing bar and has a valve connection with the branch pipe 90 of the pipe 91 within the forward wing bar, said pipe 91 having a branch 92 extending into the forward compartment 84 while a valve 93 at the upper end of the pipe 91 is regulated to admit external air pressure to the pipe 91 for delivery to the forward compartment 84. The cantilever bracing of the aerofoil as shown in Figs. 14 to 16 provides angle bar braces 94 between the spaced walls of the forward and rearward wing bars. As shown in Fig. 14, the central compartment 86 is divided by a horizontal partition 95 to provide an upper storage compartment for cargo or the like while the space below the partition 95 receives a smaller aeroplane 96 discharged therethrough by releasing the pivot platform 97. As illustrated in Fig. 16, the horizontal partition 95 within the central compartment 86 provides passenger accommodations above the same while a retracting chassis is adapted to be moved into the lower section of the compartment 86, this chassis generally shown embodies a frame bar 98 having a rack bar 99 operated by a gear upon the lower end of the rotatable shaft 100 that is operated by the type of mechanism shown in Figs. 9 and 10 and illustrated by the numeral 101, the flexible cord 70 diagrammatically illustrated as connected to the inner end of the rack bar 99 and the operating mechanism 101 associated with the shaft 100, the mechanism 101 being rendered inoperative by the flexible cord 70 at the limit of inward movement of the chassis frame 98. The bottom surface of the aerofoil is provided with a slotted opening 102 to accommodate the chassis frame 98 and the ground wheel carried thereby with the frame and wheel substantially occupying the position illustrated by dotted lines in said figure. Another form of the invention is shown in Fig. 15 wherein a particular alighting platform 103 forming a continuation of the upper wall of the aerofoil receives the aeroplane such as 96' and with the platform 103 operated by the electric motor 104 for lowering the same for delivering the aeroplane 96' onto the skid 105 to be suspended within the compartment 86 by a trip hook arrangement 95', a sliding door 97' being provided in the bottom wall of the aerofoil to permit the discharge of the aeroplane 96', upon releasing the trip hook 95'. Parcels, mail, bombs and other articles may be carried and discharged in a similar manner.

A wheeled chassis 106 for alighting on land is hingedly connected to the aerofoil as shown in connection with Fig. 16 and further illustrated in Fig. 3, and in lieu of the retracting means for the chassis shown in Fig. 16, the same may be operated by a flexible tube connection with the servo-motor as described in connection with the operating mechanism for the pontoons. Where the retractable pontoons and chassis are directly connected to the aerofoil, it is necessary to modify the rib and spar construction of the aerofoil to accommodate the reception into the aerofoil of the supporting frame bars for the pontoons and chassis, this feature of the invention being shown in Figs. 17 and 17ª, the lower bracing ribs of the aerofoil having a channel groove portion 107 with the pontoon or chassis supporting frame being of the cross sectional design as illustrated at 98' for reception in the channel recesses, this provision in no manner effecting the bracing strength of the ribs and spars and wheel permitting the complete reception of the pontoon and chassis frames within the aerofoil, and utilizing the frame members to flushly close the slots in the wings.

For purposes of further stabilizing the aeroplane when traveling on water with the pontoons 34 lowered as illustrated by dotted lines in Fig. 5, wing end pontoons 108 are hinged to swing transversely of the ends of the aerofoil with the outer faces thereof curved coincident to the curvature of the bottom surface of the aerofoil with the end pontoons received in pockets provided in the bottom faces of the aerofoils when in their closed positions as indicated by dotted lines in Fig. 5.

Figure 10:
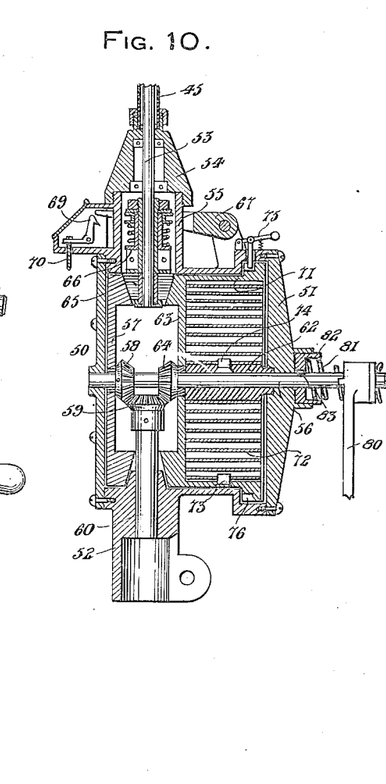
Figure 10 is a vertical sectional view of the operating device for raising and lowering the pontoon or chassis, showing a flexible shaft adapted for connection to the servo-motor and the spring motor to be placed under tension upon movement of the pontoon in one direction for storing energy to effect a reverse movement thereof.

From the above detail description of the invention, it is thought that the points of novelty fully brought out will be at once evident, it being noted that part of the resistance created by the tapering ends of the aerofoil as shown in Figs. 3 and 5 will be available as "beneficial interference" to increase the life of the outer wing sections positioned at the upper ends of the main aerofoil. By the provision of the servo-motor 40 and air pump associated therewith the mechanism shown in detail in Figs. 9 and 10 is operated thereby for raising and lowering the pontoon, the pontoon while being raised storing mechanical energy to positively effect the lowering movement thereof when desired, it being also noted that the mechanism for raising and lowering the pontoon is capable of manual operation. The air pump driven for the servo-motor supplies the interior of the airtight compartment with sufficient air for ventilation purposes as well as inflating the pontoons, and by means of a reversible pitch propeller may be used either to increase or decrease air pressure within the aeroplane compartments or the pontoons, and further supplies air to the forward compartments 84 as shown in Fig. 15 while the valve 93 controls the internal and external air pressure on the aerofoil. When the pontoon is collapsed the flexible top wall 35 is received within the bottom wall 34, permitting the bottom portion of the pontoon intimate contact with the bottom surface of the aerofoil. When the servo-motor is out of operation the same is retracted into the aerofoil as indicated by dotted lines in Fig. 7. During flight, the wing end pontoons are retracted into the aerofoil to eliminate their resistance to the flight of the aeroplane. The propellers being independently operable as above described may be selectively withdrawn into the aerofoil at will and the door covers for the slotted openings 31 shown in Figs. 11 to 13 may be closed and secured in any preferred manner. Progress in the construction of aeroplanes necessitates the displacement of pontoons and chassis during flight to reduce air resistance and while this has been previously accomplished, such displacement of the pontoons and chassis have herein been provided where pontoons and chassis are associated with a wing truss structure. It is therefore necessary to retain continuity and proportion of a wing truss positioned between the upper and lower skins of the wing and to so shape and dispose the chassis and other retractable parts that they can be drawn into the wing without interfering with the truss which is highly essential to the strength of the wing structure therefor, the combination of parts such as retractable pontoons, wing end tanks, etc., with a wing structure are believed to be novel disclosures as shown in this application, the internal trussing of the wing being clearly illustrated with sufficient space between the skins of the wing for receiving the retractable elements.

While there are herein shown and described the preferred embodiments of the invention, it is nevertheless to be understood that changes may be made without departing from the spirit and scope of the invention as claimed.

What is claimed as new is:

1. In combination with the wing of an aeroplane, a flotation means therefor normally retained at a distance from the aeroplane wing, said flotation means being suitably braced relative to said wing and adapted, during flight, to be retracted under the wing, and means to hold said flotation means securely in any position to which it is adjusted.

2. In combination with an aeroplane of the type described, an aeroplane wing, a retractable pontoon having an upper portion, spaced apart from and adapted to conform to the bottom of said wing and means to retract and extend said pontoon.

3. In combination with an aeroplane wing, a retractable pontoon having an upper portion distant from said wing when in extended position, said upper portion being collapsible into the lower portion of said pontoon.

4. In combination with an aerolane wing, a retractable pontoon having an inflatable upper portion, said upper portion being distant from said wing when the pontoon is in extended position, the form of the lower portion of said pontoon permitting the same, when retracted, to snugly engage the under portion of said wing.

5. In combination with an aeroplane wing, a collapsible and retractable pontoon, and means to collapse and retract said pontoon, the upper portion of said pontoon being spaced from said wing when the pontoon is in extended position.

6. In combination with an aeroplane wing, a retractable pontoon, bracing means associated with said pontoon and wing for holding the pontoon spaced from the wing when in extended position, said pontoon being constructed to house said braces when the pontoon is retracted, and diagonal bracing to prevent lateral pontoon displacement.

7. In combination with an aeroplane wing having a convex lower surface, a pontoon spaced apart from and retractable under said surface and being constructed to conform with the curvature of the under side of said wing when the pontoon is retracted.

8. In combination with an aeroplane wing, a retractable pontoon, braces spacing said wing and pontoon apart when the pontoon is in extended position and means located within the wing to retract said pontoon.

9. In an aeroplane, the combination with the main wing thereof, a lateral wing retractable into the main wing and a retractable pontoon adapted to be shifted for engagement with the under surface of the main wing.

10. In combination with the main wing of an aeroplane, a wing of shorter chord at the end of said wing, and a retractable pontoon adapted to fit snugly under said main wing when in retracted position.

11. In an aeroplane, the combination with a wing having slots in the under surface thereof, a retractable pontoon carried by the wing and mechanism for retracting the pontoon movable through the slot in the under surface of the wing.

12. In an aeroplane, the combination with a wing provided with cantilever spars lying in a general transverse direction to the path of the aeroplane's flight, a retractable pontoon and means located between said spars for retracting the pontoon.

13. In combination with the lower surface of an aeroplane wing, a pontoon adapted during flight to be withdrawn within the wing and one side thereof designed to lie in a plane substantially continuous with the lower wing surface.

14. In an aeroplane, the combination with a wing having an opening in the under side thereof, a retractable pontoon carried by said wing adapted to be moved into said opening and means for retracting the pontoon into said opening.

15. In combination with an aeroplane wing having openings provided in the outer surface thereof, flotation means carried by said aeroplane wing for retraction within said openings and means to close the openings during flight.

16. In combination with an aeroplane wing, a retractable alighting gear carried by the wing and means within the wing to retract said alighting gear.

17. In combination with an aeroplane wing, a retractable chassis provided with supporting wheels, and means within said wing to retract said chassis into the wing for housing the same.

18. In an aeroplane, the combination of a wing, having an opening in the lower surface thereof, a retractable chassis carried by said wing and means located within the wing to retract said chassis and house the same within the wing.

19. In an aeroplane, the combination of a wing having openings therein and having internal cantilever spars, a chassis carried by said wing and retractable into said wing through said openings, and means located between the spars to retract and extend said chassis.

20. In combination with the lower surface of an aeroplane wing, a retractable chassis, chassis frame members shaped on one side to conform with said lower wing surface and means within said wing to house said chassis.

21. In combination with an aeroplane wing, a retractable chassis, means to swing the chassis upwardly and rearwardly, a housing within said wing for the chassis, and means to hold the said chassis in any position to which it is adjusted.

22. In combination with the wing of an aeroplane, a chassis retractable into said wing, a collapsible pontoon retractable toward said wing and spaced therefrom when in extended position.

23. In combination with a seaplane, a wing, a chassis retractable within said wing and means for retracting said chassis.

24. In combination with an aeroplane provided with a pontoon, a retractable chassis, and means to retract and house said chassis, within the said areoplane.

25. In combination with an aeroplane, retractable flotation means and a chassis retractable within the closed portions of said aeroplane, and independently operating means to retract the flotation means and chassis.

26. In combination with an aeroplane provided with retractable flotation means, and braces therefor, said flotation means being constructed to permit the housing of said braces therein when said flotation means is retracted, and power means for retracting said first means.

27. The combination with an aeroplane, of two separate retractable alighting devices, housing for one of said devices when said device is retracted and independently operating means for retracting either of said alighting devices without effecting operation of the other.

28. In an aeroplane, a pair of main pontoons, and a retractable chassis adapted to be housed when retracted, and means to retain said chassis in any position to which it is adjusted.

29. In combination with a retractable chassis or alighting device, power means for retracting said device, and automatic means for disengaging said power means.

30. In an aeroplane, the combination with a retractable alighting device, power means to retract said alighting device and adapted for the storing of energy during the retraction of said alighting device and automatic means for disengaging the power means.

31. In an aeroplane, a retractable alighting device, power means located within the wing of the aeroplane for retracting said device, and automatic means for disengaging said power means.

32. In combination with a retractable chassis or alighting device for an aeroplane, a plurality of means for extending the chassis or alighting device during flight, and means to house the said chassis when retracted.

33. In combination with the wing of an aeroplane, an alighting device having portions thereof retractable into the wing, and means within the wing to retract said device and store energy during the retraction for subsequently projecting said device.

34. In combination with an aeroplane wing, a retractable chassis frame having a wheel at its lower end, provision within the wing to house the said chassis frame during flight and two separate means for retracting said chassis.

35. In combination with an aeroplane, a retractable alighting device, power means for retracting the said device and means for storing energy derived from the aeroplane motor and means for applying said energy to extend said chassis.

36. In combination with an aeroplane, a retractable chassis, means for connecting said chassis to power means for the retraction of the said chassis and means for storing surplus energy from said power means and means for applying said stored energy to said chassis for the extending of said chassis.

37. In combination with an aeroplane retractable chassis, power means for the retraction of said chassis, hand means for the retraction of said chassis and means for engaging or disengaging said power means during flight.

38. In combination with an aeroplane, retractable chassis, power means for retracting said chassis, manual means for retracting said chassis and a means distinct from either aforesaid means for extending said chassis.

39. In combination with an aircraft retractable alighting device, means for engaging the aircraft propelling power unit for the retraction of the said alighting device and spring motor means for the extension of said alighting device.

40. In combination with an aircraft alighting device, a power transmission housing adapted to contain two or more engaging and disengaging devices for the retraction or extension of the said alighting device.

41. In combination with manual means for the retraction of aircraft alighting devices, power means for operating said devices and means for engaging or disengaging at will either the power or manual means.

42. In combination with an aeroplane retractable alighting device, means for engaging the aeroplane motor for the retraction of said device, other means for extending the said device and automatic means for disengaging the first said means when the said alighting device reaches the completely retracted position.

43. In combination with an aeroplane, a retractable alighting device, power means for retracting said device and automatic disengaging means between said power means and said alighting device.

44. In combination with an aeroplane alighting device, a clutch adapted at the will of the pilot for engaging power means for the operation of said alighting device, manual means for operating the said alighting device and automatic disengaging means for said first means.

In testimony whereof I affix my signature.

JAMES V. MARTIN.